April 1, 1952
R. H. GODDARD
2,591,421
COMBUSTION CHAMBER JACKET WITH ALTERNATE
COOLING PASSAGES OF FUEL AND OXIDIZER
Filed June 28, 1946
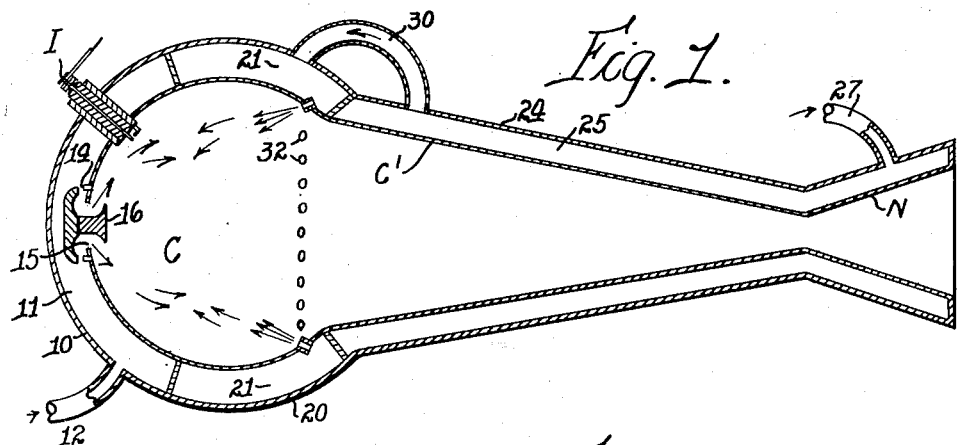
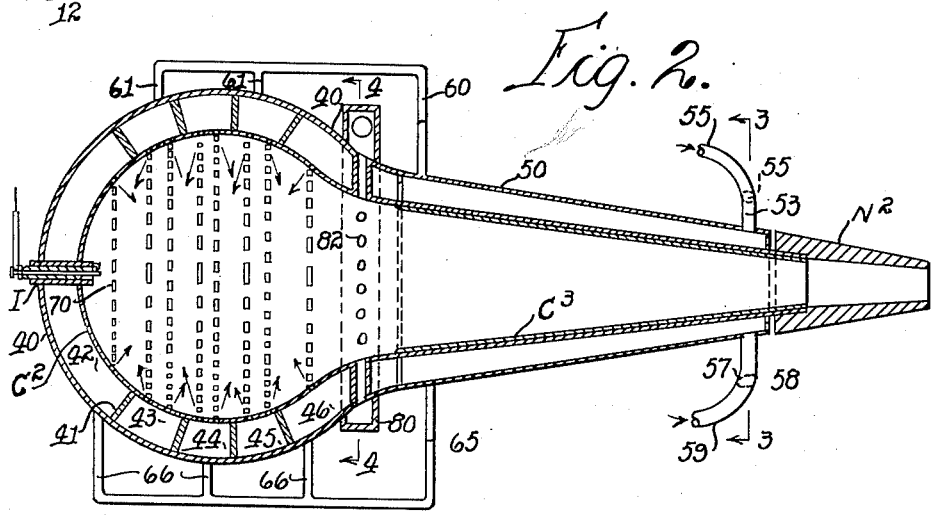
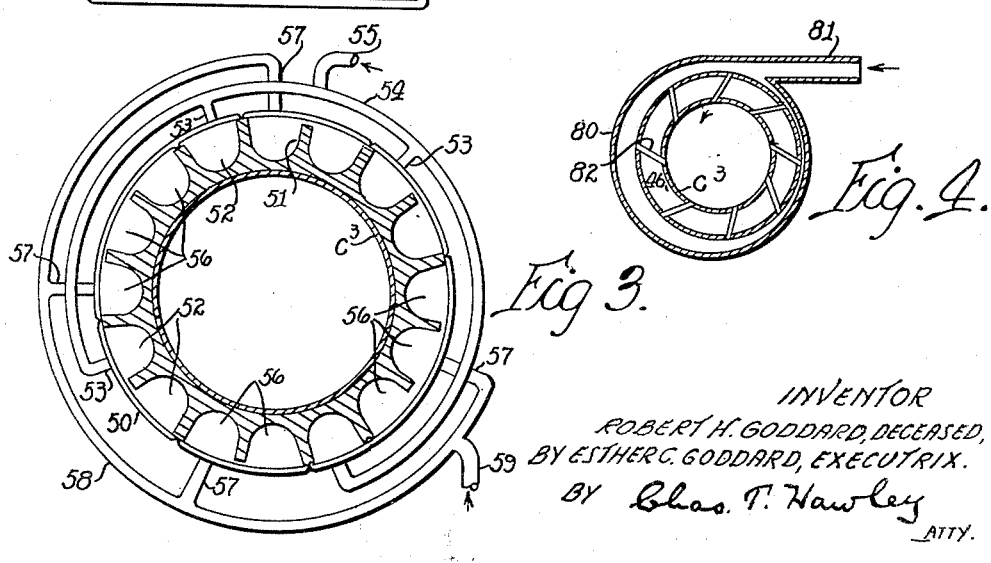
INVENTOR
ROBERT H. GODDARD, DECEASED,
BY ESTHER C. GODDARD, EXECUTRIX.
BY Chas. T. Hawley
ATTY.

Patented Apr. 1, 1952

2,591,421

UNITED STATES PATENT OFFICE 2,591,421

COMBUSTION CHAMBER JACKET WITH ALTERNATE COOLING PASSAGES OF FUEL AND OXIDIZER

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application June 28, 1946, Serial No. 680,228

1 Claim. (Cl. 60—39.46)

This invention relates to a combustion chamber designed to use a high-energy fuel, such as methane, and a very active oxidizing agent, such as ozone. Such combustion elements, when combining, produce very high temperatures, and it is well known that at such high temperatures an equilibrium is established, so that only a part of the fuel is consumed. Further combustion then depends on the subsequent drop in temperature.

It is the general object of the present invention to provide a combustion chamber in which such high energy fuels and very active oxidizing agents may be utilized more efficiently. A further object is to provide a combustion chamber in which combustion is progressive and in which the heat of the combustion gases is transformed effectively into energy of motion within the chamber, and in which such transformed and mechanical energy is conserved until the gases leave the combustion chamber at a relatively low temperature.

To the accomplishment of these objects, a combustion chamber is provided which is relatively large at the point where initial combustion takes place, and which is gradually reduced in cross section over a substantial distance as combustion progresses at decreasing temperatures and as the combustion gases move at higher speeds.

The invention further relates to arrangements and combinations of parts which will be hereinafter described and more particularly pointed out in the appended claim.

Preferred forms of the invention are shown in the drawing, in which:

Fig. 1 is a sectional side elevation of one form of combustion chamber embodying this invention;

Fig. 2 is a sectional side elevation of a modified form of combustion chamber, also embodying the invention;

Fig. 3 is an enlarged transverse sectional elevation, taken along the line 3—3 in Fig. 2; and Fig. 4 is a reduced transverse sectional elevation, taken along the line 4—4 in Fig. 2.

Referring to Fig. 1, a combustion chamber C is shown which has a generally spherical cross section at the inner and larger end where initial combustion takes place and which merges into an elongated conical portion C' which may connect at its outer end with a relatively short discharge nozzle N.

A jacket casing 10 encloses the axial or inner end portion of the chamber C and provides a jacket space 11 to which a liquid fuel, such as methane, is supplied under pressure through a pipe 12. This liquid fuel, more or less vaporized, passes from the jacket space 11 through an annular slot 14 to an opening 15 through which the liquid enters the chamber C as a conical spray diverted by a spreader 16.

A spark-plug or other igniter I may be provided in the end wall of the chamber to start combustion.

The middle portion of the chamber C is surrounded by a casing 20 providing a second jacket space 21, and the conical extension C' and nozzle N are surrounded by a jacket casing 24 providing a third jacket space 25. An oxidizing liquid, such as ozone, is supplied under pressure to the jacket space 25 through a feed pipe 27, and the jacket space 25 is connected by one or more pipes 30 to the jacket space 21.

A circular series of slots or openings 32 are provided in the wall of the chamber C through which the oxidizing liquid in the jacket space 21 and more or less vaporized is sprayed into the chamber C, where it engages and intermingles with the spray of liquid fuel introduced through the end opening 15.

Initial and partial combustion at very high temperature then takes place in the spherical portion C of the combustion chamber, and further combustion occurs as the partially consumed gases and remaining liquid particles move along the conical chamber extension C' toward the nozzle N at gradually falling temperatures. As combustion continues, the rate of gas travel increases and the cross section of the chamber may be gradually and uniformly reduced.

At the extreme end of the chamber portion C' combustion is substantially complete, the temperature of the gases has been substantially reduced, the heat energy of the gases has been largely transformed into energy of motion, and the gases move into the nozzle N at relatively low temperature but at very high speed. The usual expansion then takes place in the nozzle N, with effective propulsive action.

The provision of the jacket spaces 11, 21 and 25 surrounding the walls of the combustion chamber, the chamber extension and the nozzle act to cool the walls thereof and also to raise the temperature of the extremely cold liquids which are commonly used in the operation of this type of apparatus.

In the construction shown in Figs. 2, 3 and 4, a substantially spherical combustion chamber C2 is provided, together with a conical extension C3, both quite similar in shape to the corresponding parts previously described with reference to Fig. 1.

The spherical chamber C2 is surrounded by a jacket casing 40 which is positioned by annular partitions 41. These partitions subdivide the space between the chamber wall and the jacket casing into a series of jacket spaces 42, 43, 44, 45 and 46.

A jacket casing 50 surrounds the conical chamber extension C3, and a series of longitudinal ribs 51 (Fig. 3) are formed integral with or attached to the outer surface of the chamber extension C3 and extend longitudinally thereof to subdivide the jacket space between the chamber C3 and the casing 50 into a plurality of longitudinal segmental recesses.

Certain of these recesses 52 communicate and are connected by short tubes 53 to a distributing pipe 54 to which liquid fuel is supplied through a feed pipe 55. The remaining segmental recesses 55 are connected by short pipes 57 to a distributing pipe 58 receiving a liquid oxidizing agent through a feed pipe 59. Both liquids are under pressure.

It will be noted that the segmental jacket recesses 52 and 56 are so assembled that six recesses 52 receive fuel and the remaining ten recesses 56 receive the oxidizing agent, this being approximately the ratio in which the two materials are used in combustion.

One or more of the segmental recesses 52 containing fuel are connected by a pipe 60 and branch pipes 61 to the jacket spaces 43 and 45 previously described, and one or more of the segmental recesses 56 containing the oxidizing agent are connected through a pipe 65 and branch pipes 66 to the jacket spaces 42, 44 and 46.

A separate circular series of elongated slots or spray openings 70 is provided in the wall of the chamber C2 for each of the jacket spaces 42 to 46 inclusive, and sprays from adjacent series of slots intersect and intermingle in annular areas centered about the axis of the combustion chamber as clearly shown in Fig. 2.

The chamber extension C3 is preferably made of copper or a copper alloy having high heat conductivity and is also preferably provided on its inner surface with a plated metal coating having a very high melting point and very highly polished to reduce turbulence. Molybdenum and tungsten are suitable for this purpose. Such a surface will resist the high heat of the chamber and the heat will be rapidly taken away by the copper chamber wall and will be transferred to the liquids in the jacket spaces.

In order to retard or prevent oxidation of the polished inner surface of the extension C3, a volute 80 may be mounted on the jacket casing 40 and may be supplied with liquid hydrogen through a feed pipe 81. Tubes 82 extend through the jacket space 46 to the interior of the chamber C3 and are tangentially disposed, so that the hydrogen from the volute 80 will form a thin film interposed between the polished surface of the extension C3 and the combustion gases passing therethrough. This thin film of a non-oxidizing element largely protects the plated lining of the chamber extension from oxidation.

At its outer end the chamber extension C3 may connect with an expanding nozzle as shown at N in Fig. 1, or, if for very high altitude work, the extension C3 may be provided with a nozzle N2 which forms in effect an extension of the part C3 but with additional contraction. Such a nozzle is very desirable for high altitude operation, as it continues the contracting inner surface of the extension C3 and provides a reduced cross section at the outlet which is well adapted for very high speed, relatively low gas temperature and very low atmospheric pressure.

Having thus described the invention and the advantages thereof, it will be understood that the invention is not to be limited to the details herein disclosed, otherwise than as set forth in the claim, but that what is claimed is:

A combustion chamber for high energy fuel comprising a chamber portion in which initial combustion takes place and an elongated chamber extension, a jacket casing enclosing a jacket space about said chamber and chamber extension, and said extension having a wall of circular inner section and having a plurality of longitudinal ribs on the outer face of said wall and with the tops of said ribs closely adjacent said jacket casing, said ribs thereby dividing said jacket space into a series of longitudinal segmental recesses, and certain of said ribs engaging said jacket casing and dividing said longitudinal recesses into associated groups, means to supply a cooling liquid fuel and a cooling liquid oxidizer to alternated groups of said recesses at the ends thereof remote from said chamber portion and to discharge said liquids and vapors thereof from said recesses at the ends thereof which are adjacent said chamber portion, a plurality of annular partitions dividing the chamber jacket space into a plurality of adjacent annular zones concentric with the chamber axis and means to conduct said liquids and vapors from said groups of recesses in said chamber extension to said annular jacket zones and from said jacket zones to said chamber portion in which initial combustion takes place, and said conducting means conveying said liquids and vapors from alternated groups of recesses to alternated annular zones, whereby mixing in said combustion chamber is facilitated.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
| --- | --- | --- |
| 2,074,098 | Adams | Mar. 16, 1937 |
| 2,160,218 | Kingston et al. | May 30, 1939 |
| 2,397,834 | Bowman | Apr. 2, 1946 |
| 2,520,751 | Zucrow | Aug. 20, 1950 |

FOREIGN PATENTS

| Number | Country | Date |
| --- | --- | --- |
| 459,924 | Great Britain | Jan. 18, 1937 |